United States Patent [19]

Scott et al.

[11] Patent Number: 4,880,514

[45] Date of Patent: Nov. 14, 1989

[54] METHOD OF MAKING A THIN FILM MAGNETIC DISK

[75] Inventors: John C. Scott, Saratoga; Eric K. Li, Palo Alto; Hudson A. Washburn, Santa Clara; Nal T. Viswanathan, San Jose, all of Calif.

[73] Assignee: Akshic Memories Corporation, Santa Clara, Calif.

[21] Appl. No.: 85,300

[22] Filed: Aug. 10, 1987

Related U.S. Application Data

[62] Division of Ser. No. 730,778, May 3, 1985, abandoned.

[51] Int. Cl.$^4$ .............................................. C23C 14/34
[52] U.S. Cl. ................................ 204/192.2; 427/131; 427/132
[58] Field of Search ........... 204/192.2, 192.15, 192.12; 427/131, 132

[56] References Cited

U.S. PATENT DOCUMENTS

| | | | |
|---|---|---|---|
| 3,150,939 | 9/1964 | Wenner | 428/928 |
| 3,973,920 | 8/1976 | Tadokoro et al. | 428/928 |
| 3,996,095 | 12/1976 | Ahn et al. | 204/192.2 |
| 4,074,016 | 2/1978 | Trippel | 428/928 |
| 4,152,469 | 5/1979 | Allen et al. | 427/130 |
| 4,154,875 | 5/1979 | Yanagisawa et al. | 427/130 |
| 4,156,037 | 5/1979 | Hattori et al. | 427/130 |
| 4,224,381 | 9/1980 | Patel et al. | 427/130 |
| 4,245,008 | 1/1981 | Michaelson et al. | 428/611 |
| 4,411,963 | 10/1983 | Aine | 428/928 |
| 4,426,265 | 1/1984 | Brunsch et al. | 204/192 M |
| 4,469,566 | 9/1984 | Wray | 204/23 |
| 4,623,439 | 11/1986 | Mitsuoka et al. | 204/192.2 |

FOREIGN PATENT DOCUMENTS

| | | | |
|---|---|---|---|
| 2461997 | 2/1981 | France . | |
| 57-198542 | 12/1982 | Japan | 428/667 |
| 58-77024 | 5/1983 | Japan | 428/667 |

OTHER PUBLICATIONS

Maloney, "RF-Sputtered Chromium-Cobalt Films for High-Density Longitudinal Magnetic Recording", IEEE, 1979.

Herte et al., "Effect of Ion Bombardment During Deposition on Magnetic Film Properties", American Vacuum Society, J. Vac. Sci. Technol., Mar. 1981, pp. 153-155.

*Primary Examiner*—Robert McDowell
*Attorney, Agent, or Firm*—Joseph H. Smith

[57] ABSTRACT

A new high quality, low cost, thin-film magnetic recording member is provided, which has a coercive field strength greater than 650 Oe, a saturation magnetization greater than 10,000 Gauss, and a squareness ratio of 0.9 or larger. The member includes a substrate on which is directly sputter deposited a chromium layer, without the use of an intervening nickel-containing layer between the substrate and the chromium. A nickel-cobalt recording layer is then sputter deposited directly onto the chromium layer. In the preferred mode, the start of that nickel-cobalt deposition begins less than 100 seconds after the chromium deposition is terminated and is followed by the sputtering of a protective layer. Before the chromium deposition, the substrate is preheatead to drive off adsorbed gases, and to establish the proper conditions for the chromium deposition. The substrate is also heated during the time between when the chromium deposition ends and the nickel-cobalt deposition begins.

10 Claims, 6 Drawing Sheets

STEADY STATE TRACE OF THE FRICTION FORCE
WHEN THE DISK IS ROTATING (15 ips).

FIG. 9

ILLUSTRATION OF STICTION MEASUREMENT
(DISK STARTING).

METHOD OF MAKING A THIN FILM MAGNETIC DISK

This is a division of application Ser. No. 730,778, filed May 3, 1985, now abandoned.

This invention relates to low cost magnetic disks for use as memory storage devices, and more particularly pertains to such devices made up of multiple layers of thin-films with the magnetic layer being nickel cobalt.

The speed of modern computers has increased at least a hundredfold in recent years, often at the same or less cost than those devices which came before. That progress has been supported in many ways by progress in other technologies, such as in data storage devices. To support that progress, special demands have been made as to the characteristics of these magnetic media in regard to recording densities, so that densities of as much as $10^7$ bits per square inch can now be achieved for some hard disks. Such demands, however, have required that special techniques be developed for manufacturing such disk memory devices and that the structure of the disks themselves be highly controlled.

In the development of such devices, a common approach which is followed even today for devices not used at the highest bit densities, provides a good example of the properties desired for a high quality disk medium. That example is to coat an aluminum disk with a slurry containing gamma ferric oxide, in which the oxide consists of needlelike particles approximately a micrometer in length and a tenth of micrometer in width. Each needle consists of a variety of magnetic domains in acicular arrangement. Resultant directional magnetization occurs when the needle particles are under an external magnetic field. Alignment of the magnetic needles is achieved during the disk manufacturing process by rotating the disk in a magnetic field which is perpendicular to the plane of the disk before the slurry has dried. A resultant magnetic field in small regions of the disk is then achieved when data are written, that writing being accomplished when a magnetic transducer (a head) applies a magnetic field to a region of the medium. When the field of the head is removed, the region of polarized medium remains, thus making it possible to store information. The magnetization can be driven back to zero, and beyond, to saturation in the opposite direction, by reversing the magnetic field of the head. However, because magnetization persists in the medium, the field reversal does not immediately reverse the polarity of the region in question, i.e., hysteresis causes the reversal to lag the applied field.

For a magnetic medium, it is desirable that the remanent magnetization, $M_R$ (i.e., the magnetism that persists when the magnetic field is absent), be large, and that a moderately large field strength be necessary to demagnetize the medium (i.e., that the coercive field strength $H_C$, be large). Also, it is important that reversal of the magnetization of the medium be achieved over a small range of applied field strength, to ensure that magnetic states of the medium that are used for data storage are well defined. Hence, important attributes of a high quality magnetic recording medium are that the hysteresis loop be large (typically having a saturation magnetization $M_S$ on the order of 10,000 Gauss and larger), with a coercivity greater than 500 oersteds, and have a squareness ratio, $M_R/M_S$, near 1.0 (typically above 0.8).

Although particulate layers are still used, it is apparent that improved magnetic recording and storage devices can be achieved using solid magnetic films of materials which can achieve a higher magnetization than particulate gamma ferric oxide in a slurry. These films are chemically bonded to the substrate, so that no separate bonding or filler material is required.

A typical approach in manufacturing such a thinfilm metallic disk is to start with an aluminum or aluminum alloy disk substrate which is finished to a surface having only a slight topograph (e.g., <50 microns circumferentially and <10 microns radially) by turning and heat-flattening. Then the substrate is coated with a non-magnetic material, such as nickel or nickel phosphorous alloy, typically by electroless plating to a thickness of about 50 microns. This nonmagnetic surface is then polished to a mirror finish (surface roughness <0.04 microns) using mechanical processes to remove nodules that result from the electroless deposition leaving a final thickness of about 30 microns. Then a cobalt-nickel-phosphorous magnetic alloy is electroplated onto the non-magnetic layer as the magnetic recording medium. This is typically followed then by a coating of a protective layer such as a polysilicate film, or a polymer film, and/or a lubricant. (See U.S. Pat. No. 4,154,875, entitled "Process For Manufacturing a Magnetic Record Member," by Yanagisawa, issued May 1, 1979; and U.S. Pat. No. 4,152,469 entitled "Method of Forming a Magnetic Recording and Storage Device Having High Abrasion Resistance," by Allen, et al, issued May 1, 1979.) From a commercial production point of view, such processes leave much to be desired. Most importantly, three different types of a deposition processes are used, electroless plating for the non-magnetic layer on the substrate, electroplating of the magnetic recording layer, and often, sputtering for the protective layer. Plating systems generally are difficult to control as to plating process parameters, and are generally environmentally hazardous. Also, the polishing procedure for the electroless plating adds significant incremental costs to the price of the disk. In addition, having to follow the plating processes with a sputtering process is associated with excessive handling requirements to transfer the recording members from one apparatus and environment to another.

In another approach, described in U.S. Pat. No. 4,224,381, entitled "Abrasion Resistant Magnetic Record Members," by Patel, et al, issued September 1980, an electroless plating step is used as described above to apply a layer of non-magnetic nickel, or nickel alloy over the substrate. Then the electroless deposit is annealed for one to eight hours to create a hard semicrystalline magnetic layer, which is then followed by a non-magnetic conductive shield layer before the recording layer is deposited. This annealing process apparently eliminates the need for polishing as described earlier, but at the expense of providing an additional layer in the structure. However, this procedure, too, entails significant handling requirements because of the annealing required to convert the nickel-containing layer adjacent the substrate, and is more time-consuming than desired for a high volume commercial production environment.

Another approach to eliminate the polishing requirements for the nickel alloy layer adjacent the substrate is described in U.S. Pat. No. 4,469,566, entitled "Method and Apparatus For Producing Electroplated Magnetic Memory Disk and the Like," by Wray, issued Sept. 4, 1984. There the nickel alloy layer is electroplated rather than electroless plated, the electroplating taking place through one or more openings to directly provide a smooth, fine grain, layer which does not need to be polished. That nickel alloy layer is then followed directly by a another electroplating operation to deposit the magnetic recording medium. Although the times to produce a recording medium by such a process are within commercial realization, the process is fraught with all the difficulties inherent in electroplating operations as described earlier, i.e., environmental hazards and difficulties in process control. Further, in this particular application which uses a rotating mask to achieve uniformity of deposition, the mask and drive system must operate in the extremely hostile environment of the plating bath, which as a general rule, leads to mechanical difficulties over time.

Other efforts have been directed to eliminating entirely the nickel alloy layer adjacent the substrate. However, these efforts have been concentrated on the use of ferrites such as $Fe_3O_4$ or gamma-$Fe_2O_3$, which are generally less corrosive than the nickel-cobalt alloys, but which generally also have a lesser magnetization. In the typical approach for ferrites, an alpha-$Fe_2O_3$ layer is continuously formed using any of the procedures of vacuum deposition, i.e., chemical sputtering, co-precipitation, or chemical vapor deposition. The alpha-$Fe_2O_3$ is then reduced to $Fe_3O_4$, which is oxidized, if desired, to produce gamma-$Fe_2O_3$. An inherent problem in such a process is that it is difficult to stably reduce alpha-$Fe_2O_3$ to $Fe_3O_4$ due to the narrow temperature range for reduction, the step often resulting in excessive reduction of alpha-$Fe_2O_3$ to metallic iron. Also, it is difficult to control the temperature adequately to produce gamma-$Fe_2O_3$ with the desired magnetic properties. Even when the process is properly controlled, the typical magnetic characteristics for a recording medium of gamma-$Fe_2O_3$ is a coercive field strength of less than 400 Oe and a squareness ratio of less than 0.4. For modern medium high density recording, e.g., $12 \times 10^6$ bits/$inch^2$, such magnetic characteristics are unacceptable.

To improve the magnetic characteristics and to facilitate the production of such iron-based magnetic recording layers, it has been typical to alloy the iron with other materials, such as copper, cobalt, chromium, and niobium. In one such approach described in U.S. Pat. No. 4,156,037, entitled "Process For Magnetic Recording Medium," by Hattori, et al, the squareness was increased to over 0.7 using an iron, copper, niobium, cobalt alloy. Still, the coercive force was less than is often desired and was a maximum of less than 400 Oe.

Another alloy system is described in U.S. Pat. No. 4,245,008, entitled "Corrosion Resistant Magnetic Recording Media," by Michaelsen, et al, issued Jan. 13, 1981. In that patent, a clad layer of a non-magnetic corrosion resistant alloy, such as stainless steel, cobalt super alloy, titanium, or nickel-chromium alloys, is sputter-deposited onto a finished aluminum alloy substrate. An undercoat layer, preferably of chromium or titanium is then deposited onto the corrosion resistant clad layer to enhance the magnetic properties of the magnetic recording layer to follow. It is also suggested that in some cases the undercoat layer is not needed when the clad layer can establish the desired magnetic properties. The magnetic recording layer is then vacuum deposited by electron beam heating and is composed of a ferromagnetic alloy of iron, cobalt, and chromium. A protective overcoat, such as rhodium, is then sputter-deposited over the magnetic recording layer. Although excellent results with regard to squareness were obtained with this method (greater than 0.95 in some examples), the coercivity was often below 300 Oe and was a maximum of only 380 Oe. A further drawback of this approach is that it apparently requires two different kinds of vacuum deposition, sputtering and electron beam heating, processes which are not generally performed in a single apparatus.

In U.S. Pat. No. 4,426,265, entitled "Method of Producing a Metallic Thin Film Magnetic Disk," by Brunsch, et al, issued Jan. 17, 1984, the clad layer of the Michaelsen, et al, patent described above is eliminated, presumably since the corrosiveness of the iron-cobalt-chromium magnetic layer used is not high, e.g., as compared to nickel-cobalt magnetic layers. In Brunsch, et al, a chromium undercoat and the iron-cobalt-chromium alloy magnetic layer are obliquely sputtered at an angle of about 60°, with the thickness distribution being controlled by a sector shutter. The results achieved using the method disclosed are quite good, e.g., up to 600 Oe coercive field strength. However, the apparatus and method do not lend themselves easily to a production environment. The disk to be deposited must be rotated within the housing so that the shutter may control deposition thickness across the surface of the disk. Generally, rotating systems are inherently more difficult to maintain than static ones and require regular and intense maintenance in a sputtering environment. Furthermore, even with the shutter, it appears impossible to obtain consistently high and uniform coercivity (i.e., >600 Oe) from the inside diameter to the outside diameter of the disk. In addition, highly specialized apparatus and techniques are required to achieve the high oblique angle of incidence.

SUMMARY OF THE INVENTION

In accordance with preferred embodiments of the invention, a new high quality, low cost, metallic thin-film magnetic recording member is provided, which has a coercive field strength greater than 650 Oe, a saturation magnetization greater than 12,000 Gauss, and a squareness ratio of 0.9 or larger. The member includes a substrate on which is directly sputter deposited a chromium layer, without the use of an intervening nickel-containing layer between the substrate and the chromium. A nickel-cobalt recording layer is then sputter deposited directly onto the chromium layer, and a protective coating is typically deposited over the nickel-cobalt layer. In the preferred method of the invention, the substrate is preheated before the chromium deposition to a temperature in the range of 190° C. to 350° C., and more preferably, to a temperature in the range of 200° C. to 330° C. to drive off adsorbed gases, and to establish the proper conditions for the chromium deposition. Also, during the time T between the termination of the chromium deposition and the beginning of the nickel-cobalt deposition, the substrate temperature is maintained in the range of 190° C. to 350° C. and more preferably in the range of 200° C. to 330° C. Also, time T is held to less than 5 minutes, and preferably to less than 100 seconds, to ensure high quality magnetic properties. In the above method, the heating steps and the sputtering steps are all carried out in a vacuum of at least $5 \times 10^{-7}$ Torr, and preferably in a vacuum of about $1 \times 10^{-7}$ Torr, and without breaking vacuum between steps.

DETAILED DESCRIPTION OF THE INVENTION

Figure 1:
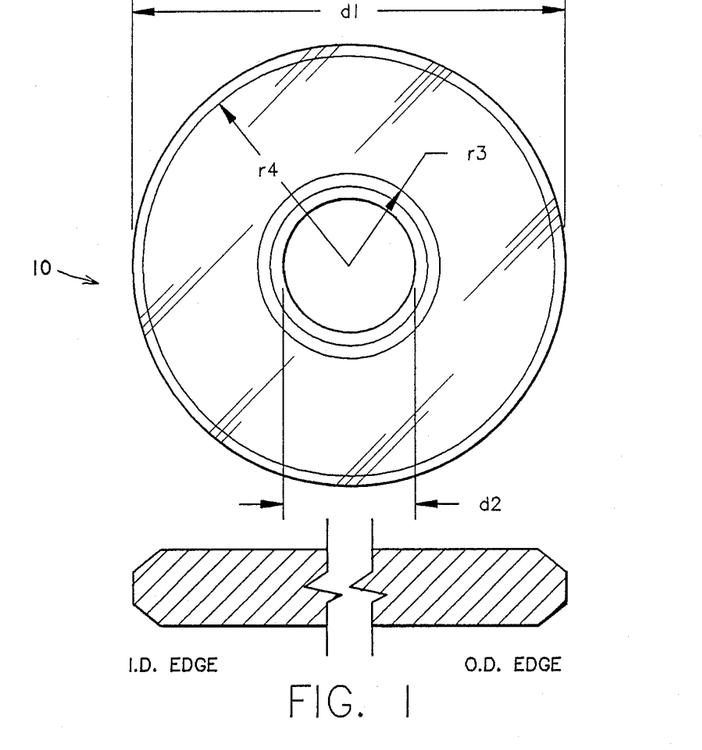
FIG. 1 shows a typical disk according to the invention.
Figure 2:
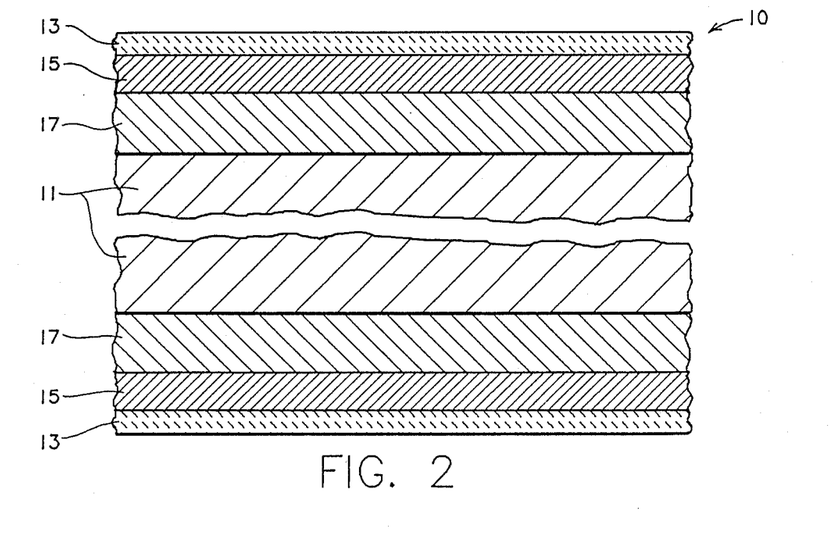
FIG. 2 shows a cross-sectional view of the disk of FIG. 1.

In accordance with a preferred embodiment of the invention shown in FIGS. 1 and 2 is a magnetic disk 10 such as might be used with a Winchester type head and drive system. In the typical 5¼ inch implementation, the disk has concentric inner and outer diameters, d1 and d2, with inner diameter d1 of about 40 mm and outer diameter of about 130 mm. The disk is typically chamfered at the outer edge of the outer diameter d2 and has a nominal thickness of about 75 mils (1.905 mm). On both sides of the disk, the region of magnetic surface over which magnetic heads may fly, i.e., the head flight zone, extends from an inner radius $r_3$ of about 27.43 mm maximum to an outer radius $r_4$ of about 63.50 mm minimum. All of these dimensions will of course vary if the size of the disk is changed from the typical 5¼ implementation, say to a 14 inch or 3½ inch format.

As illustrated in the cross-sectional view of FIG. 2, the disk is a multilayered structure symmetric on both sides about a substrate 11, having a chromium non-magnetic layer 17 directly on the substrate 11, a magnetic nickel-cobalt layer 15 directly on the chromium layer 17, and a protective layer 13 on the nickel-cobalt layer 15. This is quite unlike prior art devices which use a nickel-cobalt magnetic layer, in that there is no nickel-containing layer between the substrate and the chromium.

In the preferred mode, the substrate 11 is typically constructed of computer grade aluminum alloy 5086 having a thickness of 75 mils±1 mil (0.190 cm±0.003 cm). However, other materials such as pure aluminum, glass, plastic, or silicon may be used, and the thickness may be varied depending on the desired stiffness and inertia and the particular material used. The chromium non-magnetic layer 17 is critical to the structure, and acts to provide the seed characteristics for the nickel-cobalt magnetic layer 15, (i.e., to set up a preferred magnetic structure for layer 15) while at the same time inhibiting galvanic cell action between the nickel-cobalt layer and the substrate. In the preferred mode, the chromium layer 17, has a minimum thickness of about 1000 Å and a maximum thickness of about 4500 Å, with a preferred nominal thickness of 2000 Å±20%. To be effective, the chromium layer should be quite pure, and preferably should contain less than 0.5% by weight of other materials and should be free of cracks and bubbles. In the preferred embodiment, the magnetic nickel-cobalt layer 15 has a minimum thickness of 350 Å and a maximum thickness of 1000 Å, with a preferred nominal thickness of 430 Å±10%. The nickel content of the magnetic layer 15 should be a minimum of 15% and a maximum of 23% by weight, with a preferred nominal of 20.0%±0.8% and preferably should have a purity of at least 99.9% nickel and cobalt. In the preferred mode, the protective layer 13 is carbon, having a thickness in the range of 300 Å to 800 Å, with a preferred nominal thickness of 600 Å±10%. Different materials may also be used for the protective layer, e.g., preferably sputterable materials such as rhodium, $Al_2O_3$, or $SiO_2$.

Figure 3:
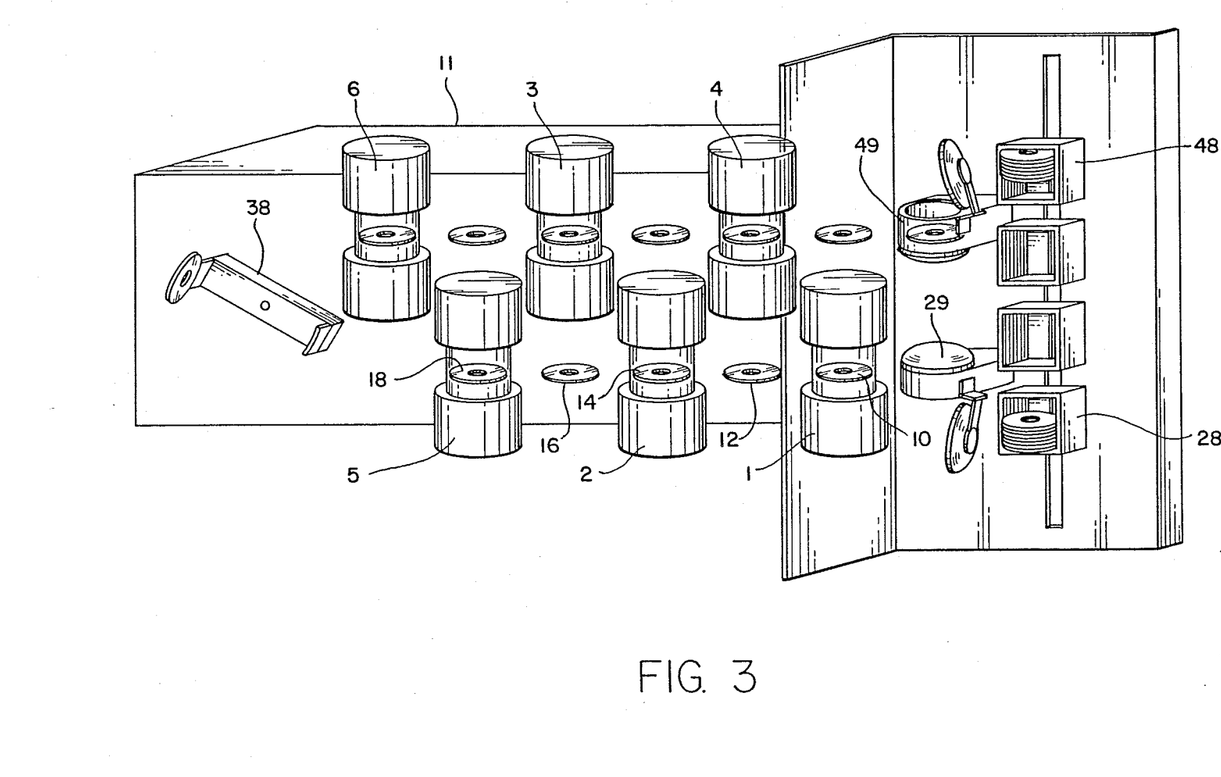
FIG. 3 illustrates the general layout of a Varian MDP-1000 disk sputtering apparatus.
Figure 4:
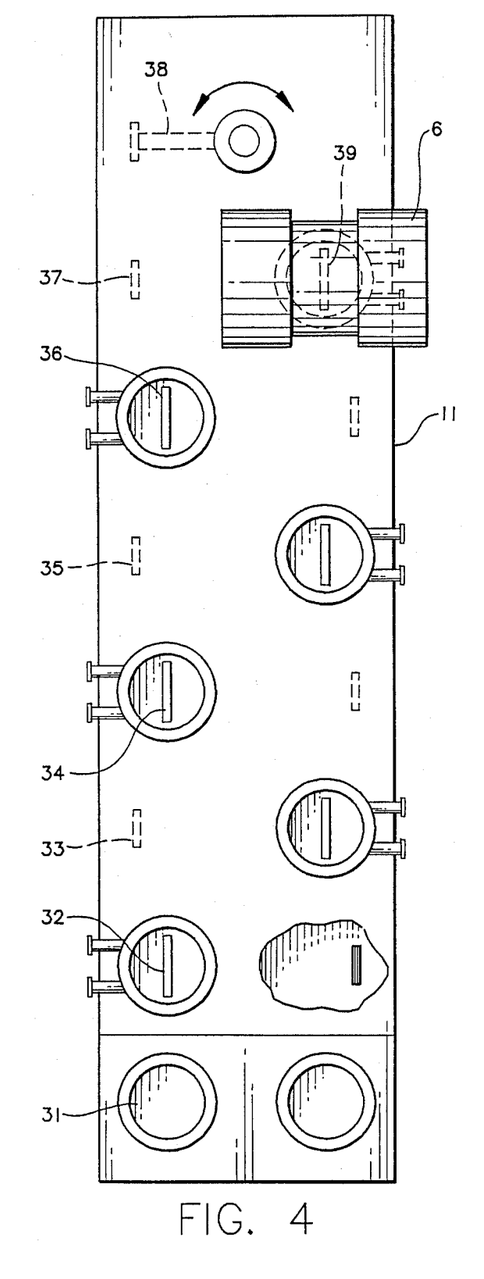
FIG. 4 shows a floor plan of the main vacuum chamber of MDP-1000.

In the preferred method of constructing disk 10, the aluminum substrate is first cleaned and polished to a surface topographic variation of less than 0.01 microns using standard mechanical techniques. The thin-films are then applied using a Varian Associates MDP-1000 disk sputtering system, illustrated in FIGS. 3 and 4. In the standard Varian implementation, the system includes a main chamber 11, for containing the various sputtering magnetrons and transport mechanisms, and for maintaining an overall system vacuum. In a typical Varian implementation, the main chamber is 12.5 inches high, by 23 inches wide, by 96 inches long, and includes sputtering stations 1 through 4, with stations 5 and 6 available as an option for additional sputtering needs. In the preferred embodiment, all six stations are used, with station 1 serving as a preheating station to drive off adsorbed gases, station 2 for sputtering chromium, station 5 for sputtering nickel-cobalt, and stations 3, 4 and 6 for sputtering carbon for the protective layer. An alternative embodiment is with station 3, 4 or 6 being inactive. In the typical Varian implementation, each sputtering station uses a pair of horizontally opposed magnetrons, with circular target geometry, known in the art as the Varian M-Gun design. By using two magnetrons in the horizontally opposed configuration with the disk held vertically therebetween, both sides of the disk are sputter coated simultaneously. Also, the vertical orientation of the disk throughout the entire process minimizes particulate collection.

Figure 5:
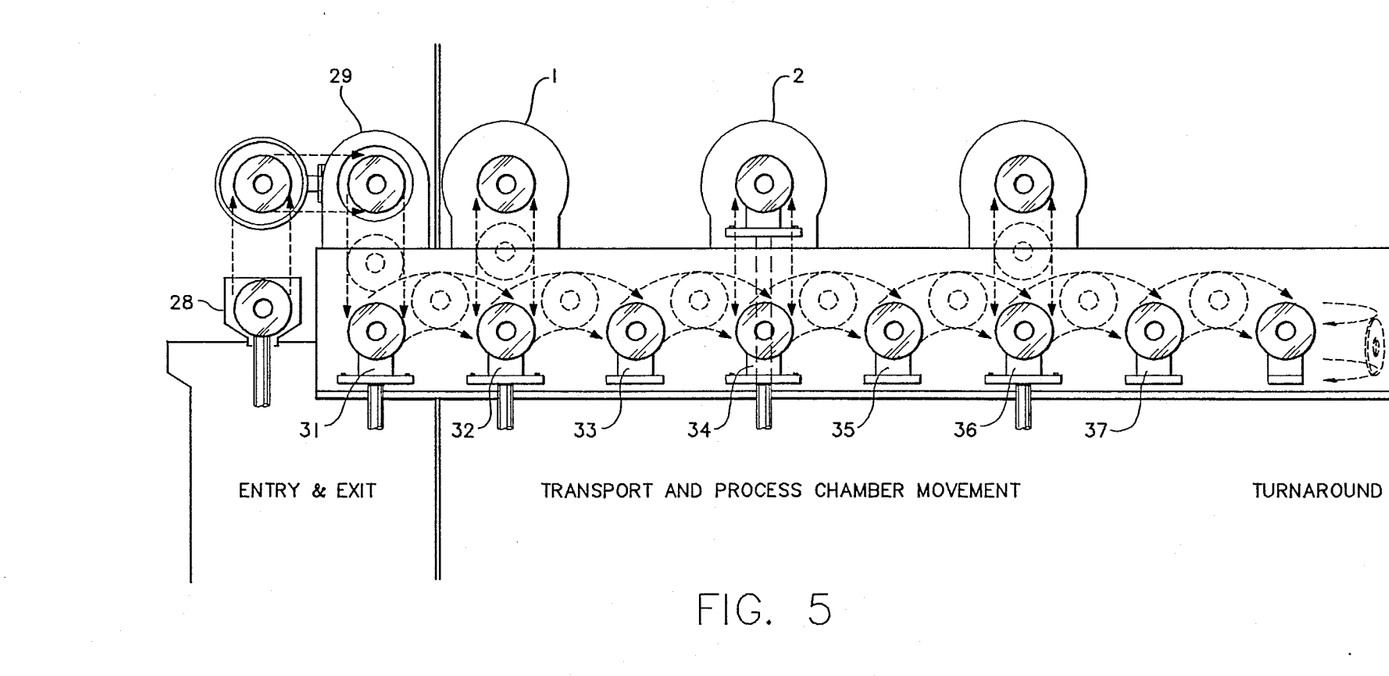
FIG. 5 illustrates the motion of a disk through the MDP-1000.
Figure 6:
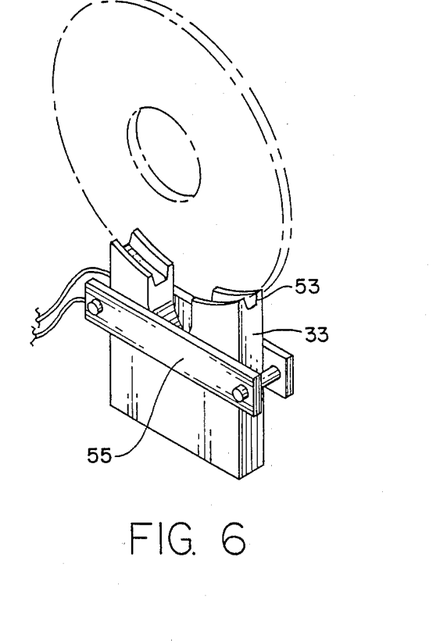
FIG. 6 shows a heated pedestal according to the invention.

In the standard Varian system, the apparatus is equipped with an automated transport system, the motion of which is illustrated in the side view chamber 11 shown in FIG. 5. Disks are automatically transferred one at a time from a standard 25-disk cassette 28 into a load lock chamber 29. The load lock chamber 29 is then pumped down, and the disk is lowered into the main chamber 11 by a vertical actuator 31. On command, the disk is then transferred by a transport system (not shown) to a vertical actuator 32 beneath station 1, and is raised into position within that station. After preheating in station 1, the actuator 32 lowers the disk, and the transport system moves the disk to a fixed pedestal 33. The transport system then moves the disk from pedestal 33 to an actuator 34, which moves the disk upwards into station 2. After deposition in station 2, the disk is moved as before to a fixed pedestal 35, then to actuator 36, and then upwards into station 5. After deposition in station 5, the disk is then moved as before to a fixed pedestal 37 from whence a rotating arm 38 picks up the disk and transports it 180 degrees to a pedestal 39 located at inactive station 6. This process then continues from actuator, to station, to actuator, to pedestal, until the disk is unloaded into a load lock chamber 49 and finally into a waiting cassette holder 48. At each transfer step from actuator to pedestal, a new disk is moved into the system so that eventually the system is full, i.e., with one disk associated with each activator and one disk with each pedestal, and the process becomes quasi-continuous, with one disk being unloaded each time a new disk is loaded. Typically, all disks are advanced in unison from one position to the next, either horizontally or vertically. For example, as disk 10 is lowered from station 1, so will disks 14 and 18 be lowered from their respective stations. Then at the same time, a new disk is moved onto actuator 32, disk 10 will be moved to pedestal 32, disk 12 will be moved to actuator 34, disk 14 will be moved to pedestal 35, etc. In this way, successive layers can be sputtered onto the disk without breaking the primary vacuum on chamber 11, and a continuous throughput can be achieved.

In the preferred embodiment, a modification has been made to the standard apparatus described above as illustrated in FIG. 5. Shown there is a typical fixed pedestal as provided by Varian Associates, such as 33, having a notch 53, in order to vertically support a disk by its chamfered edge. In the preferred mode, this standard pedestal is altered by providing a resistive heating element 55 which is placed in contact with the metallic pedestal, and is secured to the pedestal by means of screws. The resistive elements are available as stock number PT512 from Chromaloy, and generally have a power rating of 125 watts. However, other resistors may, of course, be used. Temperature control of the pedestals is achieved by monitoring the pedestal with a thermocouple, and varying the voltage across the resistive elements to achieve the desired result.

In the preferred method of producing high quality disks with the above-described apparatus, the pressure in the main chamber 11 is first reduced to less than $2 \times 10^{-7}$ Torr, and preferably to below $1 \times 10^{-7}$ Torr, as measured on a Varian 860 cold cathode gauge, and the system is checked to ensure that the following readings are obtained on a residual gas analyzer such as Inficon Model 017-450-G1: $O_2$ (mass 32) less than $0.3 \times 10^{-12}$, $H_2O$ (mass 18) less than $15 \times 10^{-12}$, $N_2$ less than $2.0 \times 10^{-12}$, and $H_2$ (mass 2) less than $10.0 \times 10^{-12}$. Similarly, the individual stations 1-5 are pumped by their individual cryopumps to achieve a gas pressure therein of less than $5 \times 10^{-7}$ Torr or lower, and all cryopumps are stabilized at a temperature of less than 15° K. The fixed pedestals are preferably heated to temperature of between 190° C. and 350° C., and more preferably, to a temperature between 200° C. and 330° C., as measured by a Fluke thermocouple meter, and allowed to stabilize (typically about 30 minutes). Standard procedures are used to ensure adequate cooling water to the station sputtering magnetrons, and gas lines for nitrogen, argon, and compressed air, are monitored to ensure adequate pressure. To begin the processing, loaded cassette 28 is then blown off with nitrogen and is placed in the proper position to be unloaded, disk by disk, into the main chamber 11, the sequence of operations proceeding as described above. At station 1, disks are preheated for about 35 seconds to a temperature of 200° C. to 330° C. to cause desorption of absorbed gases and to precondition the disk for the direct sputtering of the chromium layer 17 to follow.

The chromium layer is sputter deposited in station using an argon flow rate of 20 ml/min.±10% and argon pressure of less than 15 mTorr, with a cathode voltage of 550 volts and a target current of 8 amps+10%. The typical deposition rate is about 3000 Å/min., and the sputtering time is generally about 40 seconds, to achieve the nominal Å of chromium. Other voltages, currents and times can be used to give the same thickness of chromium. A typical target for the chromium deposition is part number 02000-24-000-00A, available from Varian Associates, which is of Grade A purity ($\geq$99.5% chromium by weight), having less than 250 parts per million of other materials therein, other than oxygen.

The nickel-cobalt layer 15 is sputter deposited in station 3, using an argon flow rate of 17 ml/min.±10%, and an argon pressure of less than 15 mTorr, with a cathode voltage of 550 volts and a target current of 2.4 amps±5%. The sputtering time is typically about 22 seconds and the preferred deposition rate is about 1090 Å/min. to achieve the preferred nominal nickel chromium thickness of 400 Å. A typical target for the nickel-cobalt deposition is part number 03100-27-003-300 available from Varian Associates, having a nominal nickel to cobalt ratio of 20 to 80, with an admixture of impurities of less than 200 parts per million.

The carbon deposition is performed in three stages as indicated earlier, the first stage in station 6, the second stage in station 3, and the third stage in station 4, since the carbon deposition rate is much lower than the metal deposition rates, only about 480 Å/min. In all three stations, the typical cathode voltage is 550 volts, the target current is 4.1 amps±10%, and the total sputtering time at each station is about 25 seconds to achieve a total preferred nominal thickness of 600 Å. Again, the argon pressure is maintained below 15 mTorr in both stations, however, the argon flow rate is maintained at about 18 ml/min. in station 3, and at about 22 ml/min. in station 4. A typical target for the carbon deposition is Spectrographic grade carbon, having a purity of 99.999%, e.g., available from Sputtering Materials, Inc. in Santa Clara, Calif.

Another important element of the method of invention is the transport time used between stations, in particular, between the chromium station 2 and the nickel-cobalt station 5. This is due to the fact that the chromium layer 17 acts to set up the seed characteristics for the preferred crystallographic configuration of the nickel-cobalt layer 15 as it is being deposited. A possible interpretation is that the chromium is instrumental in establishing a single phase hexagonal close packed magnetic structure for the nickel-cobalt layer, although other interpretations may be possible. To achieve the preferred configuration, it is important that the deposition of the nickel-cobalt layer 15 be begun only a short time after the chromium layer 17 is deposited, typically within at most a few minutes, (<5 minutes), preferably within less than 100 seconds, and more preferably within 70 seconds or less, after deposition of the chromium layer, and that the surface of the chromium be maintained in high vacuum as described above. Although the mechanism is not completely understood, it is thought that the reason for this time dependence is the formation of oxides on the chromium surface before the nickel-cobalt is sputtered thereon. With the Varian MDP-1000, the transit time between successive positions in the main chamber can be made as low as 15 seconds on a consistent basis, thereby ensuring a time lapse between the end of the chromium deposition on a disk and the beginning of the nickel-cobalt deposition on that same disk of about 70 seconds (15 seconds for movement between station 2 and pedestal 35, 40 seconds for sputtering the following disk in station 2, and another 15 seconds for movement of the disk from pedestal 35 to station 5 for nickel-cobalt deposition).

With the above high throughput method, disks of high quality are obtained at a relatively low cost. In the typical (prior art) manufacturing situation, the substrate is purchased with a layer of nickel alloy already on the aluminum surface of the substrate, adding an incremental cost of at least three dollars per disk over the cost of a similarly finished aluminum substrate without a nickel alloy layer thereon. Hence, by eliminating the nickel alloy layer, the invention provides a substantial cost savings for high volume production.

As an example of the quality, a typical disk produced by the above method using the preferred nominal values of the various parameters displays a high saturation magnetization, $M_S$, over 10,000 Gauss, and a high coercive field strength, Hc, of 650 Oe at the outer diameter of the disk, with a variation from the inner to outer diameter of the head flight zone of at most 8% radially and at most 4% circumferentially (as measured using a vibrating sample magnetometer). Also, the resulting squareness ratio, i.e., $M_S$ to the remanent magnetization $M_R$, is typically greater than 0.9, with disk to disk variation of at most 5%.

Figure 7A:
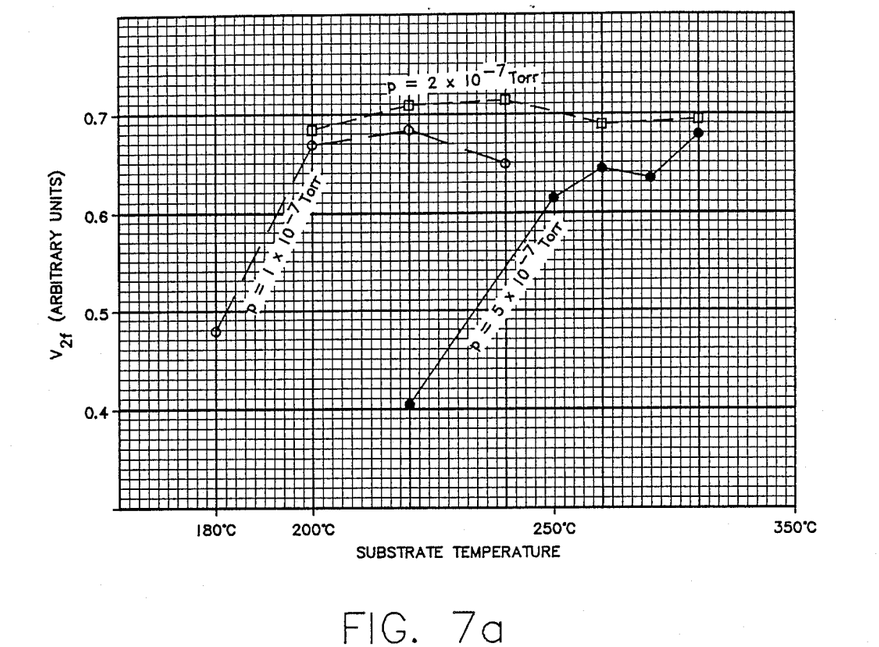
FIGS. 7A and 7B are graphs demonstrating the dependence of recording parameters on substrate temperature during the manufacturing process.
Figure 7B:
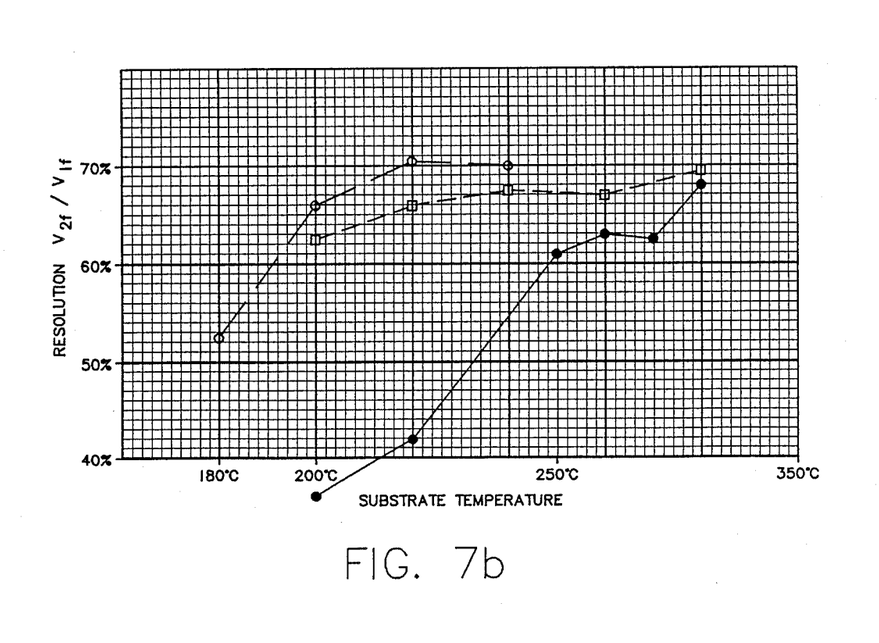

To illustrate the importance of preheating the disks appropriately in achieving desired magnetic properties, FIGS. 7A and 7B show the changes in typical recording parameters as a function of the preheating temperature of the substrate in station 1. Shown in FIG. 7A is a plot of the average track amplitude, hereinafter $V_{2f}$, recorded at a frequency $2f=(5000\pm5)\times10^3$ transitions/second, as a function of preheating temperature, the measurements being obtained using a relatively standard head having a monolithic Mn-Zn ferrite slider with a nominal gap width of 25.4 micrometers, a nominal gap length of 1.1 micrometers, having a nominal inductance of 14 microhenries in air at 1 MHz, at a nominal flying height of 0.41 micrometers at the innermost radius of the head flight zone. As illustrated $V_{2f}$ generally increases substantially as the preheating temperature is increased.

FIG. 7B is a graph of the resolution as a function of preheating temperature for several different pressures in the main chamber. (Resolution is defined as the ratio of $V_{2f}$ to $V_{1f}$, where $V_{1f}$ is the average track amplitude recorded at a frequency $1f=(2500\pm2.5)\times10^3$ transitions per second.) As shown, the resolution increases substantially as the temperature increases. Also, as the vacuum in the main chamber degrades, i.e., as it goes from $1\times10^{-7}$ Torr to $5\times10^{-7}$ Torr, a substantial increase in preheating temperature is required to achieve the same resolution. From the graph, it is apparent that to maintain a resolution above 60% even for a good vacuum, i.e. $1\times10^{-7}$ Torr, requires a temperature of about 190° C. and to obtain a resolution of over 70% requires a preheating temperature of well over 200° C. For the system where the vacuum is not as good, e.g., for a main chamber pressure of $5\times10^{-7}$ Torr, to have a resolution of over 60% requires a preheating temperature of about 250° C. and higher, and for a resolution approaching 70% (68%) requires a temperature of about 330° C. Higher preheating temperatures do not appear to substantially enhance the recording characteristics in the main chamber and as an upper limit on preheating temperatures, 350° C. appears to be a practical maximum based on physical considerations with respect to the surface characteristics of the aluminum substrate. Above that temperature, local deformations of the aluminum surface appear to cause deleterious effects on the later deposited layers. Hence, the preferred range of temperatures for preheating is from 190° C. to 350° C., with an even more preferred range of 200° C. to 330° C. when using main chamber pressures in the range of $1\times10^{-7}$ Torr to $5\times10^{-7}$ Torr. For pressures below $1\times10^{-7}$ Torr (using the cycle time between the termination of the chromium sputtering and the initiation of the nickel-cobalt sputtering of 70 seconds or less), the recording characteristics do not change appreciably with temperature compared with those represented by the curves corresponding to a pressure of $1\times10^{-7}$ Torr. Hence, for pressures at $1\times10^{-7}$ Torr and below, the preferred temperature range is the same.

Figure 8:
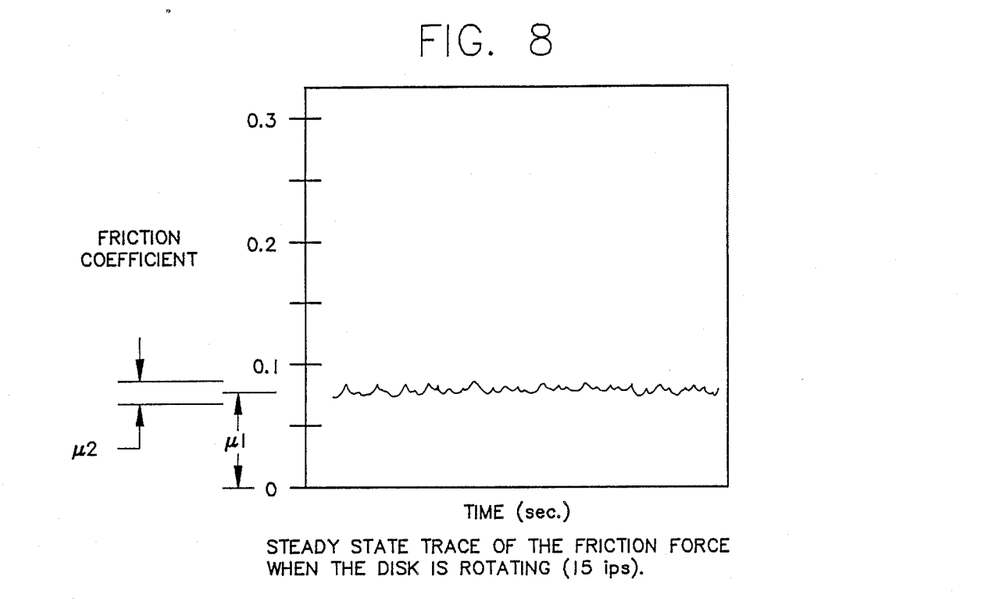
FIG. 8 is a graph showing the coefficient of moving friction for a a typical disk according to the invention.
Figure 9:
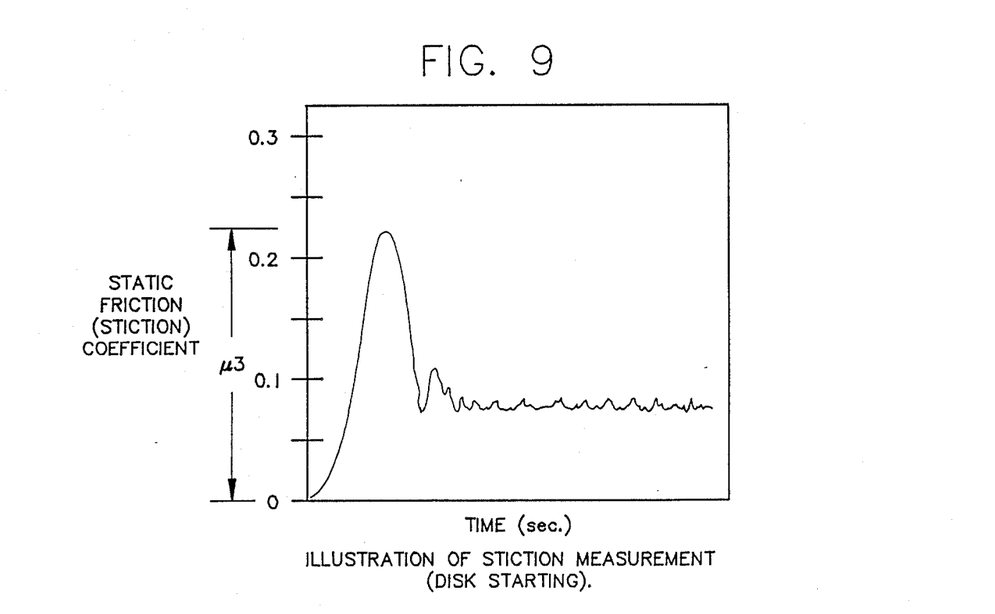
FIG. 9 is a graph showing the coefficient of static friction for a typical disk according to the invention.

In addition, tests illustrated in FIGS. 8 and 9, demonstrate that a disk produced by the above method exhibits very low friction coefficients. For example, friction coefficient $\mu_1$ is consistently less than 0.1, where $\mu_1=f_1/F$, $f_1$ is the absolute friction force measured with the disk rotating at a relative velocity of $15\pm0.5$ inches per second, and the head load F is 9.5-10.5 gm. Also, the coefficient $\mu_2=f_2/F$, where the relative friction force $f_2$, taken across the height of the force trace of FIG. 8, peak-to-peak, is less than 0.03. The static friction $\mu_3=f_3/F$, where $f_3$ is the static friction force is less than 0.25, and is measured during the first rotation of the disk and is taken from the zero position to the maximum value of the force trace. Also, the measurement is taken after a minimum period of 24 hours of contact.

Those skilled in the art will appreciate that there are many variations to the general method which are encompassed by the invention. For example, chromium deposition can be broken down into two steps. Such an alteration would merely involve sputtering chromium in stations 2 and 5, sputtering CoNi in station 6, and adding a heating element to the rotating arm 38. In addition, materials other than aluminum alloy may be used for the substrate, and materials other than carbon may be used for the protective layer. Also, it should be appreciated that the method of the invention is not restricted to use with the Varian MDP-1000 which is merely a convenient vehicle for carrying it out. All that is required is that the sequence of chromium and nickel-cobalt sputtering steps be able to be carried out without breaking vacuum and that the appropriate heating can be ensured.

We claim:

1. A method of constructing a thin-film disk recording device comprising:
   heating a substrate to a temperature in the range of 190° C. to 350° C.;
   sputtering chromium onto said substrate during a first time interval to form a chromium layer on said substrate;
   sputtering a magnetic layer comprising cobalt and nickel onto said chromium layer during a second time interval;
   heating said substrate and chromium layer thereon during the time between said first time interval and said second time interval in a vacuum greater than or equal to $5\times10^{-7}$ Torr, to a temperature in the range of 190° C. to 350° C., said time between said first and second time intervals being less than 5 minutes; and
   depositing a protective layer over said magnetic layer.

2. A method as in claim 1 wherein said time between said first time interval and said second time interval is less than 100 seconds.

3. A method as in claim 1 wherein the step of heating during the time between said first time interval and said second time interval comprises placing said substrate with said chromium layer thereon on a heated pedestal.

4. A method as in claim 3 wherein said heated pedestal has a temperature in the range of 190° C. to 350° C.

5. A method as in claim 4 wherein the temperature of said pedestal is between 200° C. and 350° C.

6. A method as in claim 5 wherein said chromium layer consists of at least 99.5% by weight of chromium.

7. A method as in claim 6 wherein said magnetic layer consists of at least 99.9% by weight of nickel and cobalt.

8. A method as in claim 1 wherein said sputtering steps are carried out in a vacuum of at least $5 \times 10^{-7}$ Torr.

9. A method as in claim 8 wherein said heating step and said sputtering step are carried out without breaking said vacuum between said heating step and said sputtering steps.

10. A method as in claim 9 wherein said vacuum is at least $1 \times 10^{-7}$ Torr.

* * * * *